United States Patent
Agostinacchio et al.

(10) Patent No.: US 9,851,960 B2
(45) Date of Patent: Dec. 26, 2017

(54) TENANT ALLOCATION IN MULTI-TENANT SOFTWARE APPLICATIONS

(71) Applicant: International Business Machines Corporation, Armonk, NY (US)

(72) Inventors: Domenico Agostinacchio, Rome (IT); Franco Mossotto, Rome (IT); Riccardo Pizzutilo, Rome (IT); Luigi Presti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 14/815,294

(22) Filed: Jul. 31, 2015

(65) Prior Publication Data

US 2016/0054991 A1 Feb. 25, 2016

(30) Foreign Application Priority Data

Aug. 22, 2014 (GB) .................................. 1414953.8

(51) Int. Cl.
G06F 9/44 (2006.01)
G06F 9/445 (2006.01)
G06F 9/50 (2006.01)

(52) U.S. Cl.
CPC ................. G06F 8/61 (2013.01); G06F 8/62 (2013.01); G06F 9/4451 (2013.01); G06F 9/50 (2013.01); G06F 9/5005 (2013.01)

(58) Field of Classification Search
CPC ......... G06F 8/61–8/62; G06F 9/445–9/44594; G06F 9/50; G06F 9/5005
See application file for complete search history.

(56) References Cited

U.S. PATENT DOCUMENTS 8,539,078 B2 9/2013 Duan et al.
9,052,942 B1 * 6/2015 Barber .................. G06F 9/4843
(Continued)

FOREIGN PATENT DOCUMENTS

WO WO2013/109509 A3 7/2013
WO WO2013/138979 A1 9/2013
WO WO2014/039497 A1 3/2014

OTHER PUBLICATIONS

Force.com, The Force.com Multitenant Architecture, Understanding the Design of Salesforce.com's Internet Application Development Platform, p. 1-16, 2008.*
(Continued)

*Primary Examiner* — Thuy Dao
*Assistant Examiner* — Mongbao Nguyen
(74) *Attorney, Agent, or Firm* — Frances Lammes; Stephen J. Walder, Jr.; Richard A. Wilhelm

(57) ABSTRACT

A solution is proposed for managing a multi-tenant software application adapted to serve a plurality of tenants. A deletion request is received for deleting one of the tenants from the plurality of tenants. Responsive to receiving the deletion request, an instance of the software application associated with the tenant to be deleted is disabled. The disabled instance of the software application associated with the tenant to be deleted is deleted after a protection period from the deletion request. An addition request for adding a new tenant to the software application is received. An instance of the software application for the new tenant is allocated to a selected instance of the software application.

18 Claims, 7 Drawing Sheets

(56) References Cited

U.S. PATENT DOCUMENTS

| | | | |
|---|---|---|---|
| 2005/0120160 A1* | 6/2005 | Plouffe | G06F 9/45537 711/1 |
| 2007/0094665 A1* | 4/2007 | Jackson | G06F 9/50 718/104 |
| 2008/0270583 A1* | 10/2008 | Gonzalez | G06F 8/61 709/222 |
| 2010/0077449 A1 | 3/2010 | Kwok et al. | |
| 2011/0321031 A1* | 12/2011 | Dournov | G06F 9/45533 717/171 |
| 2012/0110338 A1 | 5/2012 | Druschel et al. | |
| 2012/0174085 A1 | 7/2012 | Driesen et al. | |
| 2013/0047150 A1* | 2/2013 | Malasky | G06F 9/44547 717/176 |
| 2013/0074091 A1* | 3/2013 | Xavier | G06F 9/5011 718/104 |
| 2013/0086322 A1 | 4/2013 | Pelletier et al. | |
| 2013/0117453 A1 | 5/2013 | Bjerke et al. | |
| 2013/0144945 A1* | 6/2013 | Said | G06Q 30/00 709/204 |
| 2013/0185404 A1* | 7/2013 | Patel | H04L 61/2557 709/222 |
| 2013/0232503 A1* | 9/2013 | Volvovski | G06F 11/1044 718/104 |
| 2013/0268740 A1 | 10/2013 | Holt | |
| 2013/0339972 A1* | 12/2013 | Zhang | G06F 9/5066 718/104 |
| 2014/0074539 A1* | 3/2014 | Doering | G06Q 10/06315 705/7.25 |
| 2014/0075029 A1* | 3/2014 | Lipchuk | G06F 9/505 709/226 |
| 2014/0130043 A1 | 5/2014 | Mahindru et al. | |
| 2014/0282469 A1* | 9/2014 | Johnson | G06F 8/65 717/170 |
| 2014/0366010 A1* | 12/2014 | Fan | G06F 8/61 717/169 |
| 2015/0039930 A1* | 2/2015 | Babashetty | G06F 11/1464 714/4.11 |
| 2015/0052515 A1* | 2/2015 | Choi | H04M 1/72525 717/178 |
| 2015/0052535 A1* | 2/2015 | Fujii | G06F 9/46 718/104 |
| 2015/0134626 A1* | 5/2015 | Theimer | G06F 17/30289 707/693 |
| 2015/0172367 A1* | 6/2015 | Said | H04L 67/306 709/204 |
| 2015/0186228 A1* | 7/2015 | Kumar | G06F 11/2028 714/4.12 |
| 2015/0205974 A1* | 7/2015 | Talley | G06F 11/2094 707/781 |
| 2015/0370674 A1* | 12/2015 | Lazar | G06F 11/263 705/14.1 |

OTHER PUBLICATIONS

Mohamed Almorsy, Adaptable, model-driven security engineering for SaaS cloud-based applications, pp. 187-222, 2013.*

David Dau Chuen Shue, Multi-Tenant Resource Allocation for Shared Cloud Storage, Recommend for Acceptance by the Department of Computer Science Adviser: Processor Michael J. Freedman, Jun. 2014, pp. 1-138, ftp://ftp.cs.princeton.edu/reports/2014/976.pdf.*

Rouven Krebs, Resource Usage Control in Multi-Tenant Applications, 2014 14th IEEE/ACM International Symposium Cluster, Cloud and Grid Computing, 2014, pp. 122-131, http://ieeexplore.ieee.org/document/6846447/.*

Javier Espadas, A tenant-based resource allocation model for scaling software-as-a-Service applications over cloulds computing infrastructures, 2013, pp. 1-14.*

Anna Schwanengel, Challenges with Tenant-Specific Cost Determination in Multi-Tenant Applications, 2013, pp. 1-7.*

David Dau Chuen Shue, Multi-Tenant Resource Allocation for Shared Cloud Storage, 2014, pp. 2-24.*

Search Report under Section 17(5) dated Feb. 19, 2015, Application No. GB1414953.8, 3 pages.

* cited by examiner

TENANT ALLOCATION IN MULTI-TENANT SOFTWARE APPLICATIONS

BACKGROUND

The present disclosure relates to the data processing field. More specifically, this disclosure relates to multi-tenant software applications.

Multi-tenant software applications are used to serve multiple users (referred to as tenants) by each instance thereof (instead of having a separate instance of the software application for each user). For this purpose, each multi-tenant software application is designed to partition die data of its tenants logically (for example, by means of corresponding filters); in this way, each tenant is provided with a virtual software application emulating a dedicated instance of the multi-tenant software application. The multi-tenant software applications provide significant cost savings and management simplifications.

A typical example is in a cloud computing (or simply cloud) environment, wherein users of a communication network are allowed to exploit computing resources on-demand as services (referred to as cloud resources and cloud services, respectively); the cloud services are made available by cloud providers, which provision, configure and release the cloud resources upon request (so that their actual implementation is completely opaque to the users). In this way, the users are relived of the management of the actual physical resources that are needed to implement the cloud resources (for example, their installation and maintenance); particularly, this provides economies of scale, improved exploitation of the physical resources, and high peak-load capacity. Moreover, the users are now allowed to perform tasks (on a pay-per-use basis) that were not feasible previously because of their cost and complexity (especially for individuals or small companies). The de-coupling of the cloud resources from their implementation provides the illusion of an infinite capacity thereof; moreover, the de-localization of the physical resources implementing the cloud resources enables the users to access them from anywhere. In this case, the multi-tenant software applications may be provided by corresponding services that are delivered on-demand by the cloud providers according to the Software-as-a-Service (SaaS) model.

The tenants of each multi-tenant software application are routinely added and deleted. A typical example is when a "try and buy" mechanism is implemented to acquire new customers. In this case, a trial period is offered for evaluating the delivered service free of charge (after which the service may be actually subscribed to with the payment of a corresponding fee). Usually, a same instance of the multi-tenant software application is used to serve both tenants in the trial period and tenants subscribed to the service; in this way, the conversion of every tenant in the trail period that decides to subscribe to the service simply requires changing its status, without the need of any migration of the corresponding data.

Whenever a tenant is deleted (for example, when the service is not subscribed to after the trial period), the corresponding data is removed. Moreover, a slot of resources of the multi-tenant software application assigned to the deleted tenant (comprising the filters for accessing the corresponding data) is freed, so as to return available for a new tenant.

However, some data of the tenants may be stored in shared structures for all the tenants (for example, log files) that do not have a granularity allowing its deletion individually at the level of each tenant. Therefore, until these shared structures are purged (for example, periodically) so as to remove the data of all the tenants, comprising the ones to the deleted, no new tenants may be re-assigned their slots (since otherwise the new tenants would be granted access to the data of the deleted tenants by means of the corresponding filters).

The resulting delay in the re-assignment of the slots of the tenants to be deleted may require the deployment of new instances of the multi-tenant software application. Indeed, each instance of the multi-tenant software application usually may serve a number of tenants at most equal to a maximum value for performance reasons (for example, to comply with a corresponding Service Level Agreement, SLA). Therefore, when the number of tenants in all the instances of the multi-tenant software application has reached this maximum value, no new tenant may be allocated thereto; this happens even if some of the tenants are to be deleted, but the corresponding slots may not be re-assigned yet since their data is still stored in the shared structures. In this case, a new instance of the multi-tenant software application is to be deployed for serving the new tenant.

The resulting higher number of instances of the multi-tenant software application involves corresponding cost increases and management complications (comprising for the distribution of the new tenants throughout them).

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of distinguishing the tenants to be deleted when adding a new tenant.

In one illustrative embodiment, a method, in a data processing system, is provided for managing a multi-tenant software application. The illustrative embodiment receives a deletion request for deleting one of the tenants from the plurality of tenants. The illustrative embodiment disables an instance of the software application associated with the tenant to be deleted in response to receiving the deletion request. The illustrative embodiment deletes the disabled instance of the software application associated with the tenant to be deleted after a protection period from the deletion request. The illustrative embodiment receives an addition request for adding a new tenant to the software application. The illustrative embodiment allocates an instance of the software application for the new tenant to a selected instance of the software application. In the illustrative embodiment, the selected instance is selected between one of a set of one or more available instances of the software application and to anew instance of the software application according to an indication of the number of the tenants allocated to each available instance of the software application reduced according to the number of the tenants thereof.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
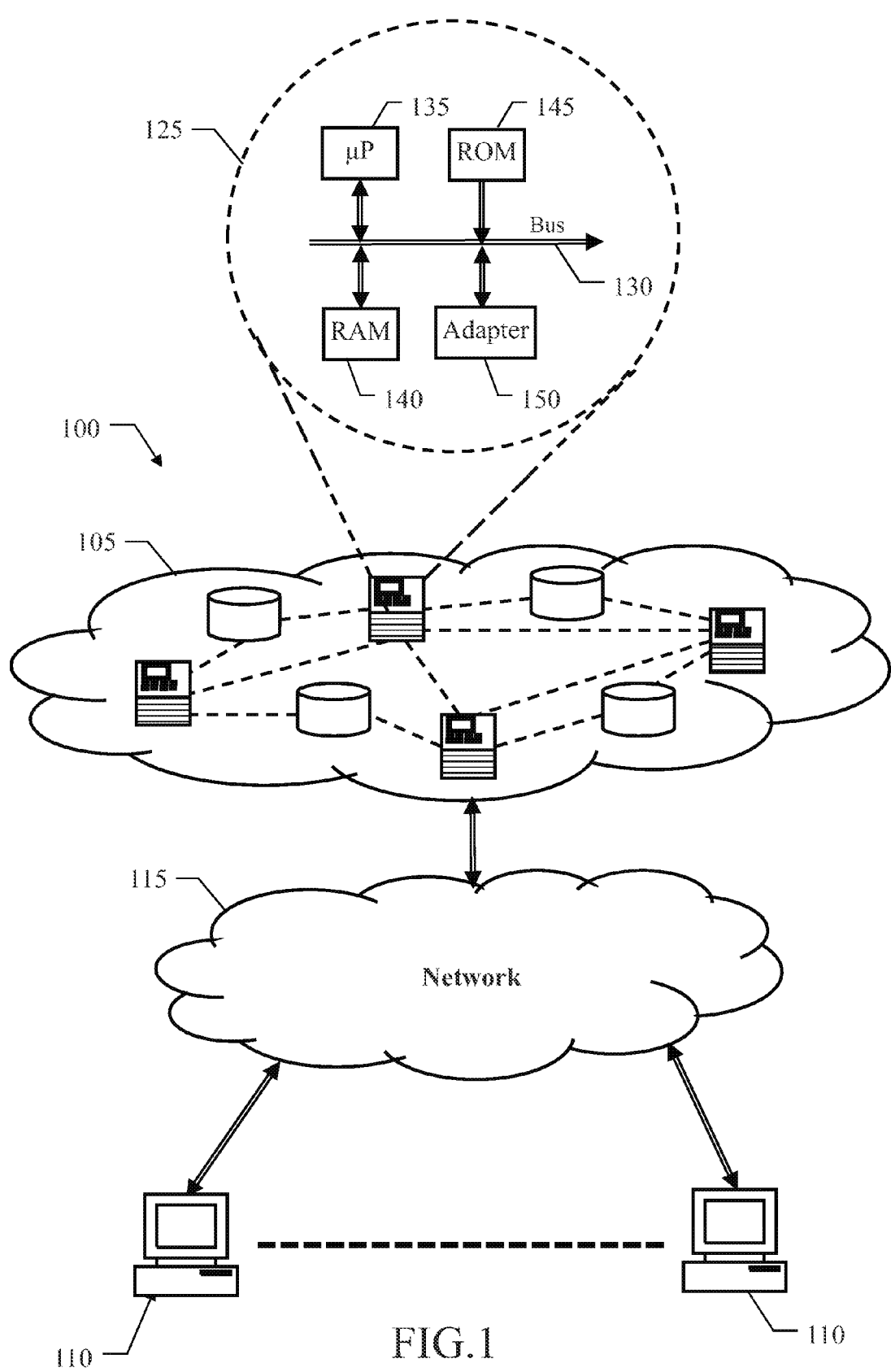
FIG. 1 shows a schematic block-diagram of a computing system that may be used to practice the solution according to an embodiment of the present disclosure.

With reference in particular to FIG. 1, a schematic block-diagram is shown of a computing system 100 that may be used to practice the solution according to an embodiment of the present disclosure.

Particularly, the computing system 100 is a cloud (computing) infrastructure that comprises one or more cloud providers 105 (only one shown in the figure). Each cloud provider 105 is an entity that provides a pool of cloud resources (i.e., shared computing resources that may be provisioned, configured and released very rapidly) on-demand to users thereof; these cloud resources are generally of the virtual type (i.e., emulations by software of physical resources). Each user of the cloud provider 105 has the sole control of the corresponding cloud resources, which may then be used exactly as if they were dedicated physical resources.

The users connect to the cloud providers 105 with corresponding computing machines 110 (for example, of the thin type) through a communication network 115; for example, the communication network may be the Internet when the cloud infrastructure 100 is public (with the cloud providers 105 that are third parties billing the users on a pay-per-use basis).

For this purpose, each cloud provider 105 exposes a front-end component (which may be accessed, for example, via a web browser). The cloud resources are actually implemented by a back-end component of the cloud provider 105; typically, the back-end component of the cloud provider 105 comprises a pool of physical server computing machines (or simply servers) and storage devices (implementing their mass memories) being loosely coupled to each other, with a redundant architecture to ensure the required reliability level (which back-end component is not accessible from the outside, so that the users are completely agnostic about its actual location and configuration). A generic server of the cloud provider 105, denoted with the reference 125, comprises several units that are connected in parallel to a bus structure 130. In detail, a set of (one or more) microprocessors (μP) 135 controls operation of the server 125; a RAM 140 is directly used as a working memory by the microprocessors 135, and a ROM 145 stores basic code for a bootstrap of the server 125. Moreover, the server 125 comprises a network adapter 150, which is used to connect it to the other servers and to the storage devices of the cloud provider 105 (and to the communication network 115).

In the context of the present disclosure, the cloud resources comprise SaaS facilities, and particularly services providing one or more multi-tenant software applications (adapted to serve multiple users, or tenants, by each instance thereof); an example of these multi-tenant software applications is a workload scheduler, which is used to control the execution of jobs in the cloud infrastructure 100 (such as the "IBM Workload Automation" by IBM Corporation, trademarks thereof). The service providing each multi-tenant software application is implemented by one or more offering instances thereof, each one comprising one or more computing machines (generally virtual machines) running an instance of the multi-tenant software application.

Figure 2:
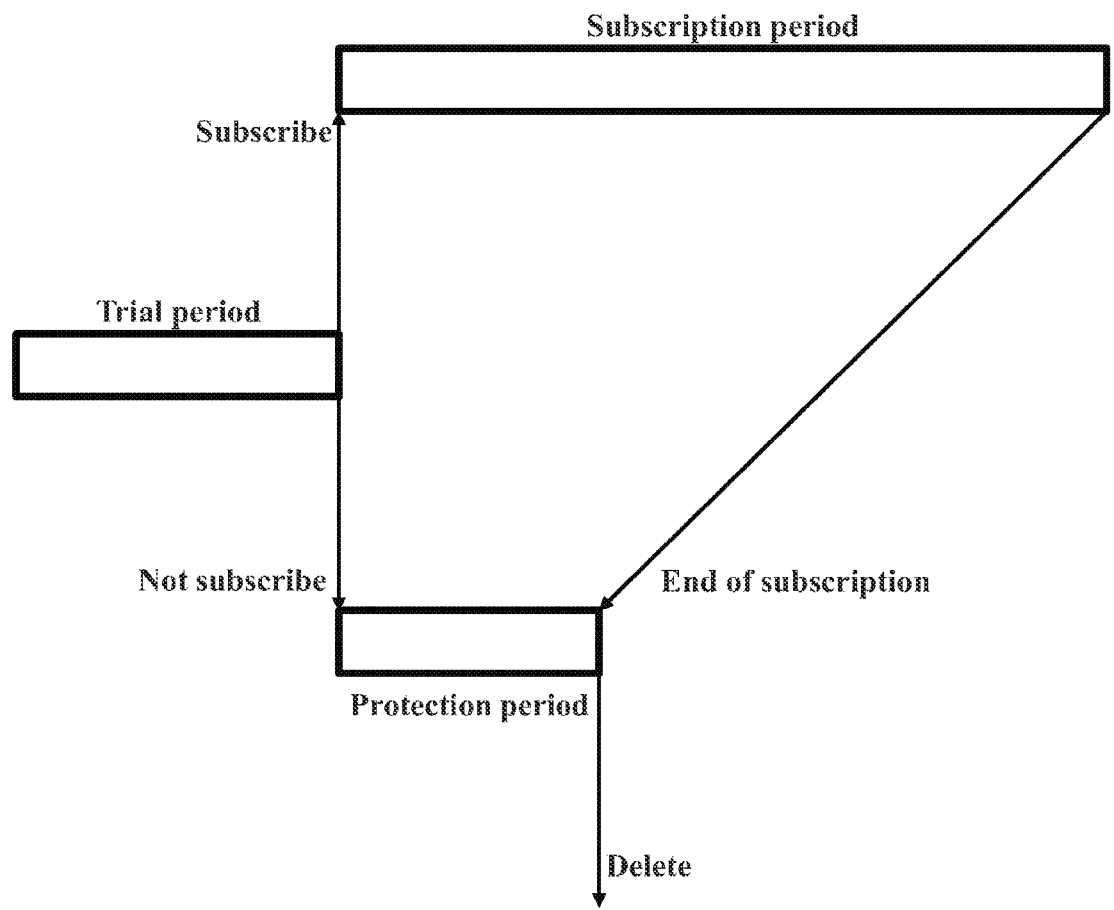
FIG. 2 shows an exemplary scenario wherein the solution according to an embodiment of the present disclosure may be applied.

With reference now to FIG. 2, an exemplary scenario is shown wherein the solution according to an embodiment of the present disclosure may be applied.

Particularly, a typical life-cycle of a generic tenant usually starts with the registration for a trial period of the service providing the multi-tenant software application (with the corresponding cloud provider); this allows the tenant to try the multi-tenant software application free of charge for its evaluation (for example, for 5-30 days). Before the expiration of the trial period, the tenant may actually subscribe to the service (with the payment of a corresponding fee); the tenant may then continue using the multi-tenant software application regularly. Alternatively, the tenant may subscribe to the service directly, even without any trial period thereof.

Conversely, if the tenant does not subscribe to the service, at the expiration of the trial period (possibly after a grace period granted by the cloud provider) the tenant is to be deleted; the same happens when the subscription to the service ends (for example, when it is not renewed). However, the tenant may not be deleted immediately but only after a protection (or quarantine) period; for example, when some data of the tenants is stored in shared structures (for all the tenants) that do not have a granularity allowing its deletion individually, the tenant may be deleted only after the shared structures have been purged removing its data (so as to allow releasing corresponding filters for accessing the data without any risk that new tenants being re-assigned them might be granted access to the same data).

With reference now to FIG. 3A-FIG. 3D, an exemplary application is shown of the solution according to an embodiment of the present disclosure.

Figure 3A:
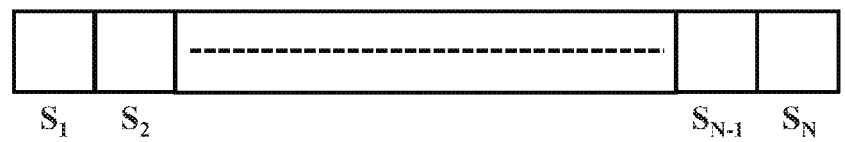
FIG. 3A-FIG. 3D show an exemplary application of the solution according to an embodiment of the present disclosure.

Starting from FIG. 3A, a generic offering instance has multiple slots $S_i$ (with i=1 ... N) of resources of the corresponding multi-tenant software application for its tenants. For example, these resources comprise filters for accessing the data of the tenants (for example, corresponding identifiers); particularly, the data may be stored both in partitioned structures with a granularity allowing its deletion individually at the level of each tenant (for example, dedicated databases, dedicated tables or views of common databases) and in shared structures with a granularity not allowing its deletion individually at the level of each tenant (for example, common files). For example, when the multi-tenant software application is a workload scheduler, the shared structures may be log files and plan files (which store mixed data of all the tenants). The number of slots (N) is equal to a maximum value of the tenants that may be served by the offering instance for performance reasons (for example, to comply with a corresponding SLA); for example, all the slots Si may be pre-apportioned when the offering instance is deployed (so as to be immediately available for assignment to its tenants).

Figure 3B:
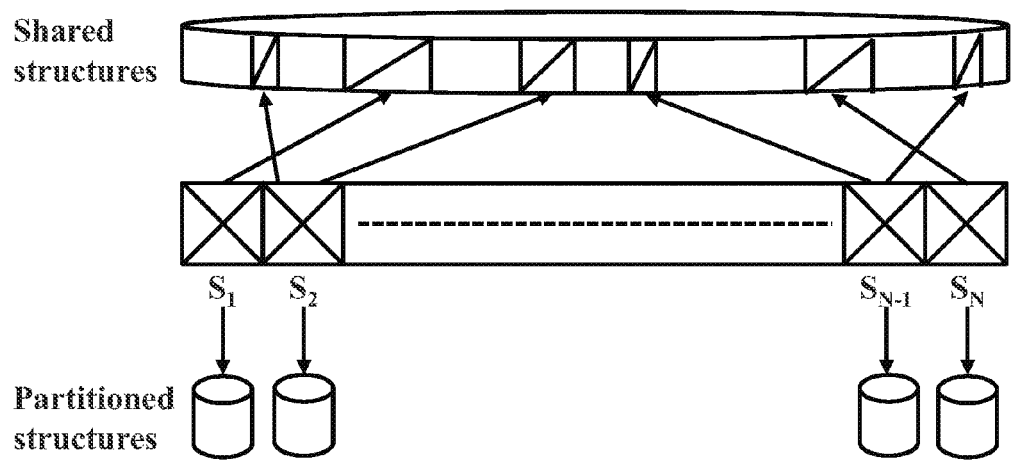

Moving to FIG. 3B, each new tenant that is allocated to the offering instance is assigned a free slot $S_i$ that is not assigned yet to another tenant (as indicated by a corresponding cross). Each tenant may then store, update and delete data in the corresponding partitioned structures identified by its filters (so that the access thereto is limited to the tenant only); other data of the tenant may be stored in the shared structures (wherein it may be accessed only by the tenant with its filters, but it may not be delete individually).

Once the number of tenants allocated to the offering instance has reached the maximum value N, all the slots $S_i$ are assigned thereto so that no free slot is available any longer; in this condition, no new tenant may be allocated to the offering instance. Therefore, if a new tenant is to be added to the service a new offering instance should be deployed.

Figure 3C:
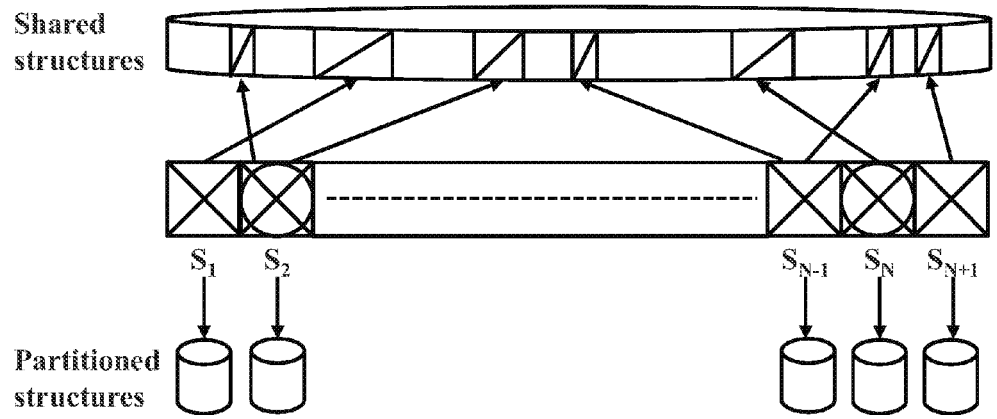

Moving to FIG. 3C, one or more tenants (for example, the tenants to which the slots $S_2$ and $S_N$ have been assigned) are to be deleted (for example, because the trail period of the service has expired or the subscription to the service has ended). These tenants may not be deleted immediately, since otherwise a new tenant that might be assigned the same slots $S_2, S_N$ would be granted access to the data of the deleted tenants in the shared structures by means of the corresponding filters. Therefore, until the shared structures are purged (for example, periodically) so as to remove the data of all the tenants (comprising the ones to be deleted), in this case as well if any new tenant is to be added to the service a new offering instance should be deployed.

In the solution according to an embodiment of the present disclosure, instead, each tenant to be deleted is disabled, or frozen (as indicated by a corresponding circle). An indication of the number of all the tenants (allocated to the offering instance) reduced according to the number of its disabled tenants is now taken into account for determining whether any new tenant may be allocated to the offering instance or whether the deployment of a new offering instance is required. For example, the number of tenants minus the number of disabled tenants, i.e., the number of tenants that are actually active in the offering instance, is compared with the maximum value N; any new tenant is then allocated to the offering instance when the number of active tenants is strictly lower than the maximum value N (assuming that the offering instance actually has the capacity of allocating a number of tenants higher than the maximum value N but it should not be used at its full capacity for performance reasons), whereas a new offering instance is deploying otherwise. Therefore, in the example at issue wherein the number of active tenants is equal to N−2, two more new tenants may be allocated to the offering instance (without the need of deploying any new offering instance even if the number of tenants has reached the maximum value N).

In this way, the performance of the offering instance is maintained within the desired level (for example, still complying with the corresponding SLA), since the disabled tenants do not contribute to the workload of the offering instance (or their contribution may be deemed negligible). At the same time, the disabled tenants are not taken into account (or they are taken into account to a limited extent only) for determining whether any new tenant may be allocated to the offering instance; as a result, the deployment of (useless) new offering instances is reduced with corresponding cost savings and management simplifications.

In a specific implementation, as shown in the example at issue, when a new tenant is allocated to the offering instance (since the number of active tenants is lower than the maximum value N) but no free slot $S_i$ is available (since the number of tenants has reached the maximum value JV), a new slot $S_{N+1}$ is apportioned (in excess to the maximum value N); this slot $S_{N+1}$ is then assigned to the new tenant (with a sort of over-booking of the offering instance), so as to ensure that no access to the data of the other tenants (comprising the disabled ones) is granted.

In this way, any slots in excess to the maximum value N are apportioned only when they are necessary; this avoids the need of pre-apportioning all the slots that might be required (i.e., further N slots) when the offering instance is deployed, which pre-apportioning might involve corresponding cost and deployment time increases.

Figure 3D:
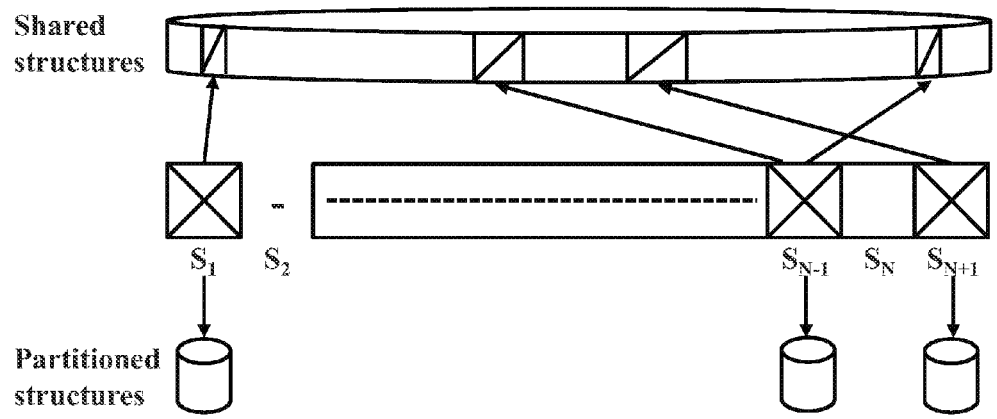

Moving to FIG. 3D, once the shared structures have been purged, any disabled tenants (i.e., the tenants to which the slots $S_2$ and $S_N$ have been assigned in the example at issue) may be actually deleted, since their data in the shared structures has been removed now (with their data in the partitioned structures that may have been removed at any time). When the slots are not in excess to the maximum value N (i.e., their number is equal thereto), the slots of the deleted tenants are freed (or released) so as to return available for their re-allocation to new tenants; otherwise, the slots of the deleted tenants are dropped (or removed) so as to compensate the slots in excess to the maximum value N (thereby avoiding the risk of having the number of active tenants exceeding the maximum value N). Therefore, in the example at issue the slot $S_2$ is dropped (for compensating the slot $S_{N+1}$) whereas the slot $S_N$ is released.

Figure 4:
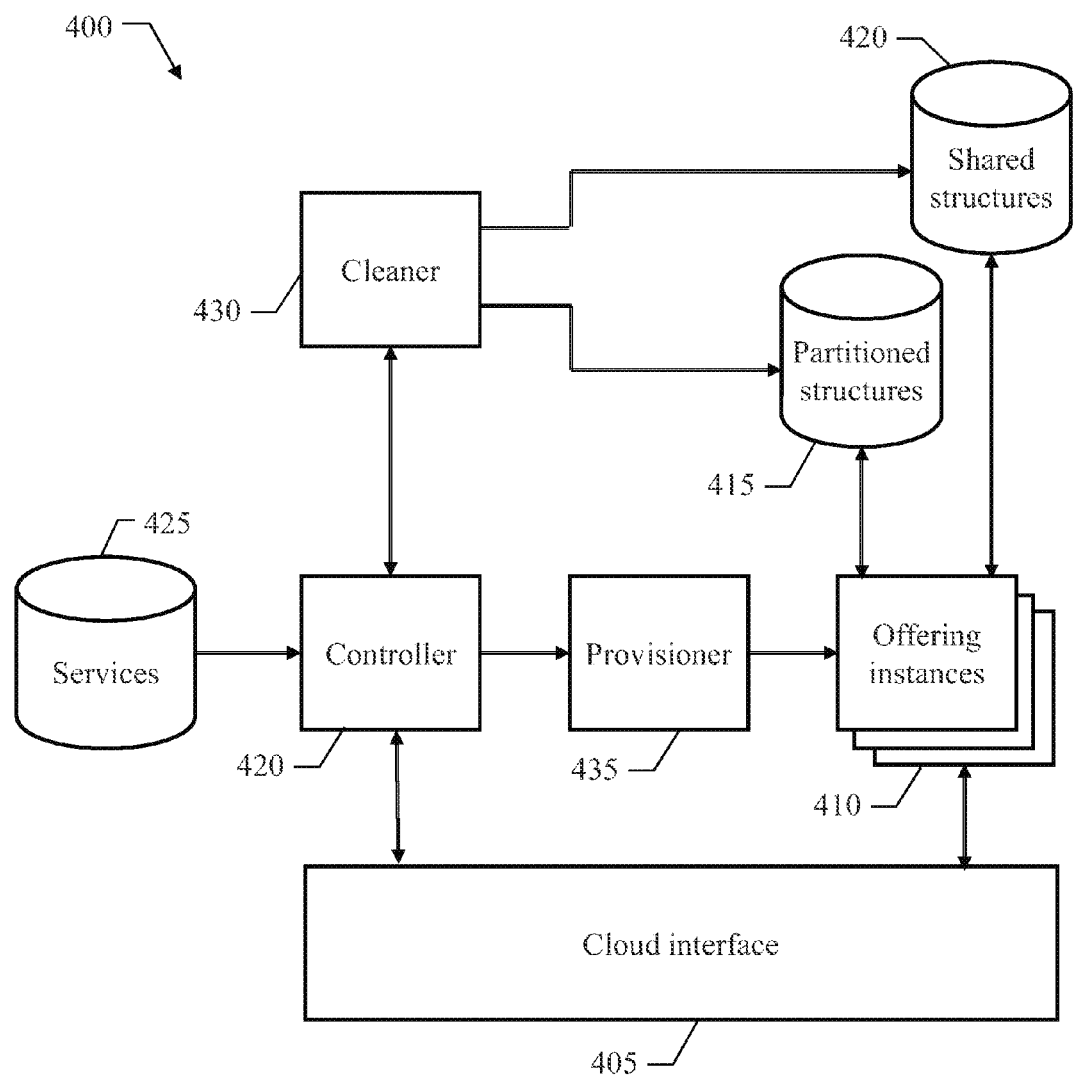
FIG. 4 shows the main software components that may be used to implement the solution according to an embodiment of the present disclosure.

With reference now to FIG. 4, the main software components are shown that may be used to implement the solution according to an embodiment of the present disclosure.

Particularly, all the software components (programs and data) are denoted as a whole with the reference 400. The software components 400 are typically stored in the mass memory and loaded (at least partially) into the working memory of one or more (physical or virtual) servers of a generic cloud provider when the programs are running. The programs are initially installed into the mass memory, for example, from removable storage units or from the communication network. In this respect, each software component may represent a module, segment or portion of code, which comprises one or more executable instructions for implementing the specified logical function.

Particularly, the cloud provider exposes a cloud interface 405 for accessing it. In the context of the present disclosure, the cloud interface 405 is used by end users (tenants) to access the multi-tenant software applications that are provided as services by the cloud provider; each multi-tenant software application is implemented by one or more offering instances 410, each one with its partitioned structures and shared structures denoted with the references 415 and 420, respectively.

Moreover, the cloud interface 405 allows administrator users to access a controller 420 that controls the services providing the multi-tenant software applications. For this purpose, the controller 420 manages a service repository 425 that stores configuration information of these services (and particularly, of the offering instances of the corresponding multi-tenant software applications and of their tenants). The controller 420 also controls the offering instances 410 of each multi-tenant software application. For this purpose, the controller 420 interacts with a cleaner 430 that removes the partitioned structures 415 (upon request) and purges the shared structures 420 (periodically). In addition, the controller 420 interacts with a provisioner 435 (for example, the "IBM SmartCloud Provisioning" by IBM Corporation, trademarks thereof) that provisions cloud resources (and particularly deploys new offering instances of the multi-tenant software applications) upon request.

Figure 5A:
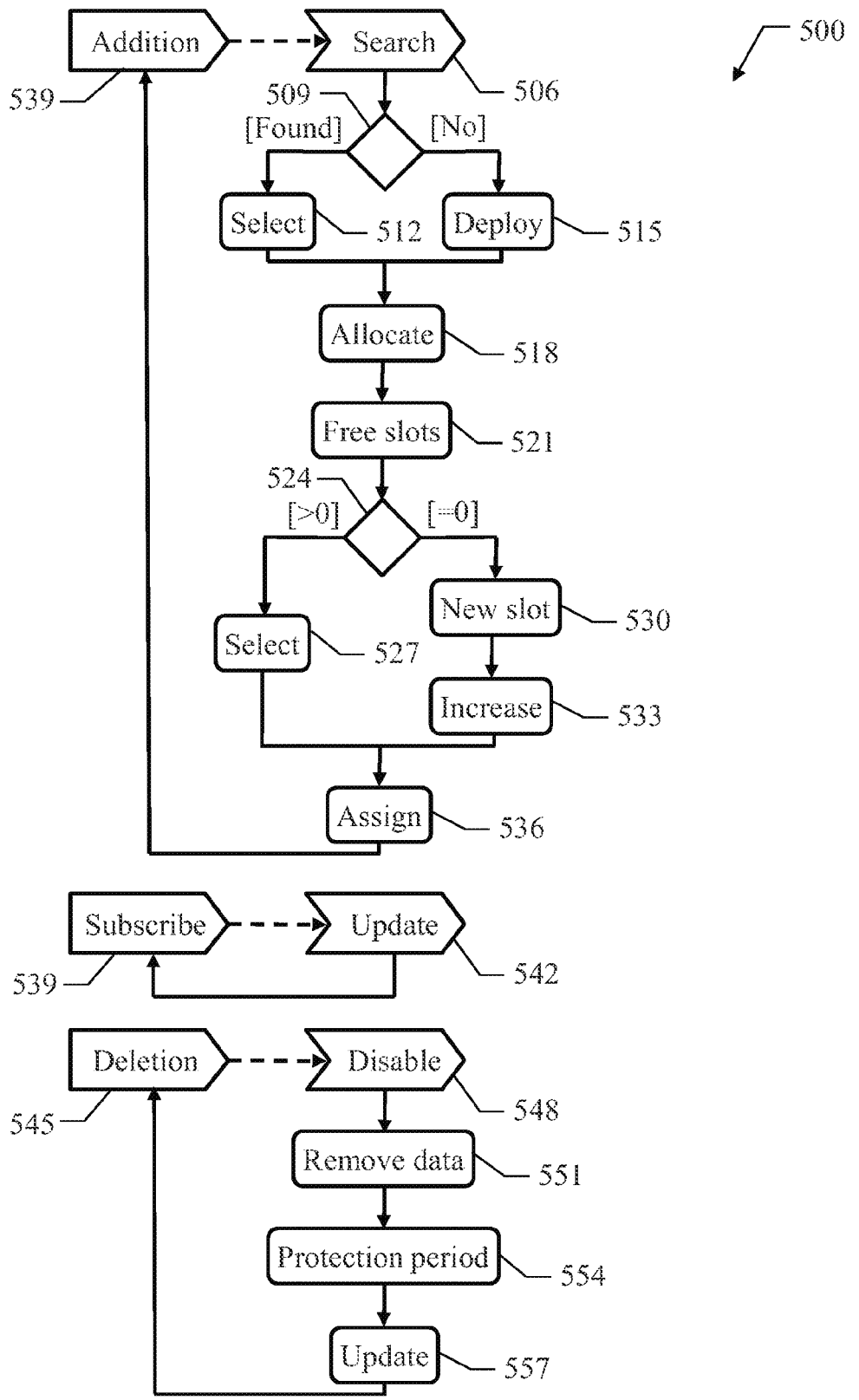
FIG. 5A-FIG. 5B show an activity diagram describing the flow of activities relating to an implementation of the solution according to an embodiment of the present disclosure.
Figure 5B:
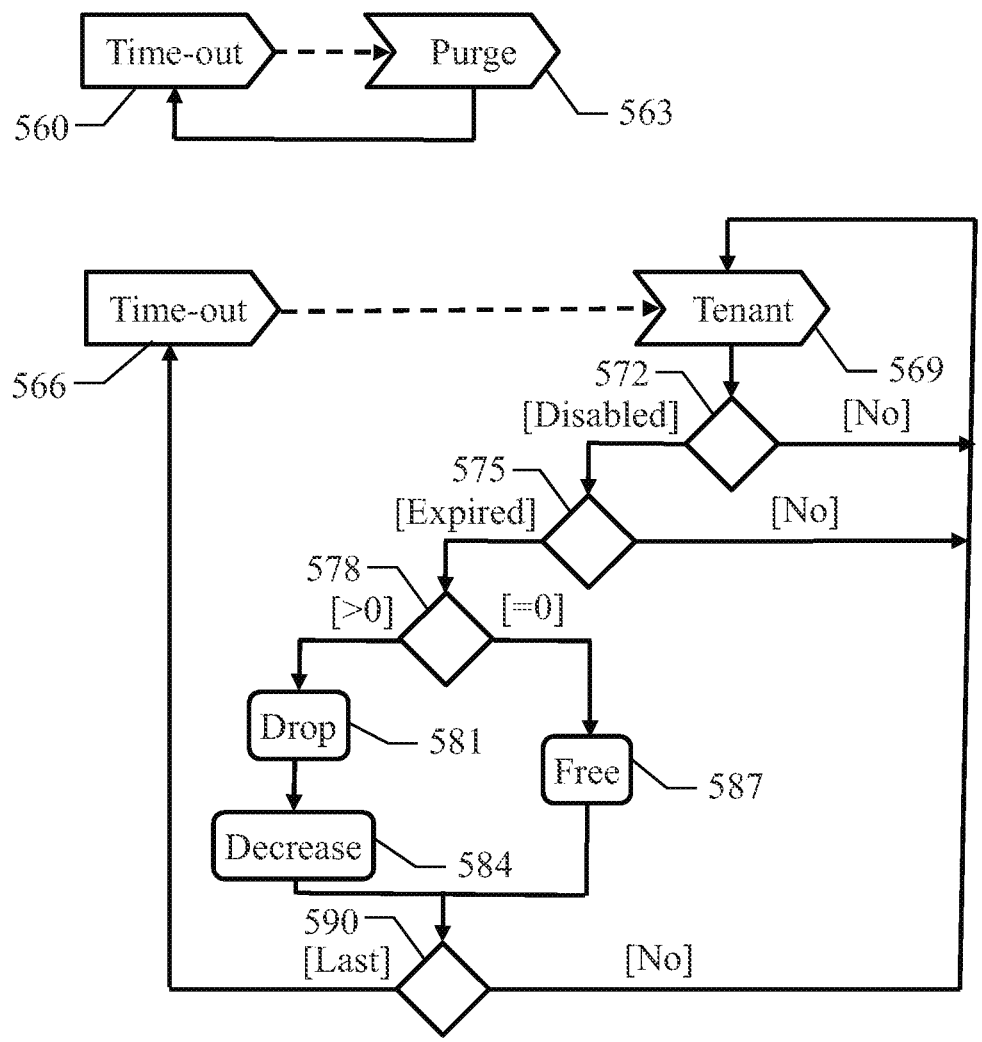

With reference now to FIG. 5A-FIG. 5B, an activity diagram is shown describing the flow of activities relating to an implementation of the solution according to an embodiment of the present disclosure.

Particularly, the diagram represents an exemplary process that manages the allocation of the tenants in a generic multi-tenant software application with a method 500. In this respect, each block may represent one or more executable instructions for implementing the specified logical function on the above-mentioned server(s).

The process begins at block 503 and then passes to block 506 whenever an addition request is received for adding a new tenant to the multi-tenant software application (either for a trial period or actually subscribing thereto). In response thereto, one or more offering instances of the multi-tenant software application that are eligible to allocate the new tenant are searched; particularly, each offering instance is considered eligible to allocate the new tenant when the number of its active tenants Ta (i.e., the number of all tenants T minus the number of disabled tenants Td) is strictly lower than the corresponding maximum value N (as indicated in the configuration information of the offering instance):

$$Ta<N, \text{ with } Ta=T-Td.$$

The flow of activity branches at block 509 according to the result of this search. If one or more eligible offering instances have been found, one of them is selected at block 512 for allocating the new tenant (for example, according to load-balancing techniques). Conversely, a new offering instance of the multi-tenant software application is deployed at block 515 (with a corresponding new entry for its configuration information that is added to the service repository) and this new offering instance is automatically selected for allocating the new tenant.

In both cases, the flow of activity merges again at block 518 (from either the block 512 or the block 515) wherein the new tenant is allocated to the selected offering instance. For this purpose, a new entry for its configuration information is added to the service repository and it is populated accordingly; for example, the configuration information of the new tenant comprises newly created credentials thereof for accessing the service (such as identifier, password, certificate, role), its status (such as trial or subscribed) and a corresponding expiration date (at the end of the trail period or of the subscription period, respectively).

Continuing to block 521, the number of free slots Sf of the selected offering instance is calculated as the maximum value N plus the number of excess slots Ne minus the number of tenants T (i.e., being either active or disabled):

$$Sf=N+Ne-T.$$

The flow of activity branches again at block 524 according to the number of free slots Sf. If the number of free slots Sf is strictly higher than zero (Sf>0), one of them is selected at block 527 (in any arbitrary order) for assigning to the new tenant. Conversely, when the number of free slots Sf is equal to zero (Sf=0), a new free slot (in excess to the maximum value N) is created at block 530, and this new slot is automatically selected for assigning to the new tenant. Accordingly, the number of excess slots Ne is increased by one (Ne=Ne+1) at block 533. The flow of activity merges again at block 536 (from either the block 527 or the block 533) wherein the selected free slot is assigned to the new tenant (by updating its configuration information accordingly). The process then returns to the block 503 waiting for a next addition request.

In a completely independent way, the process passes from block 539 to block 542 whenever a tenant in the trail period subscribes to the service (with the payment of the corresponding fee). In response thereto, the configuration information of the tenant is updated accordingly (by changing its status from trial to subscribed, with the addition of billing information and the set of its expiration date to the end of the subscription period). The process then returns to the block 539 waiting for a next subscription to the service.

In a completely independent way, the process passes from block 545 to block 548 whenever a deletion request for deleting a tenant of the multi-tenant software application is received (for example, after its expiration date plus a grace period). In response thereto, the tenant to be deleted is disabled by updating the status thereof (from trial/subscribed to disabled) in its configuration information (so as to prevent the disabled tenant from accessing the multi-tenant software application). Continuing to block 551, the data of the disabled tenant is removed from the partitioned structures (for example, by removing the corresponding databases, tables or views). The protection period of the disabled tenant is calculated at block 554; for example, the protection period is set to the highest time up to the purging of each shared structure (storing data of the disabled tenant). The configuration information of the disabled tenant is updated at block 557 by setting the expiration of its protection period accordingly. The process then returns to the block 545 waiting for a next deletion request.

In a completely independent way, the process passes from block 560 to block 563 whenever a time-out for purging each shared structure expires (for example, every 15-60 days). In response thereto, the corresponding shared structure is purged (thereby removing the data of all the tenants stored therein). The process then returns to the block 560 waiting for a next expiration of each time-out.

In a completely independent way, the process passes from block 566 to block 569 whenever a time-out for the deletion of the disabled tenants expires (for example, every day). In response thereto, the tenants of each offering instances are scanned in succession (in any arbitrary order). The flow of activity branches at block 572 according to the status of a (current) tenant (retrieved from its configuration information). If the tenant is not disabled, the process directly returns to the block 569 to process a next tenant. Conversely, if the tenant is disabled the expiration of the corresponding protection period (retrieved from its configuration information as well) is verified at block 575. If the protection period has not expired yet, the process again returns to the block 569 to process a next tenant. Conversely, if the protection period has expired, the number of excess tenants Ne of the corresponding offering instance is verified at block 578. If the number of excess tenants Ne is strictly higher than zero (Ne>0), the slot of the disabled tenant is dropped at block 581 (so as to prevent its re-assignment). Accordingly, the number of excess tenants Ne is decreased by one (Ne>Ne−1) at block 584. Referring back to the block 578, if the number of excess tenants Ne is equal to zero (Ne=0), the slot of the disabled tenant is freed at block 587 (so as to return available for its re-assignment). In both cases, the flow of activity merges at block 590 from either the block 584 or the block 587. The same operations (blocks 578-587) may also be performed immediately in response to the request of deleting the tenant (i.e., at the block 557) when no data of the tenant is stored in any shared structures (so that its protection period is equal to zero). At this point, a test is made to verify whether all the tenants have been processed. If not, the process returns to the block 569 to repeat the same operations on a next tenant. Conversely (once all the tenants have been processed), the above-described loop is exit and the process returns to the block 566 waiting for a next expiration of the time-out.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any entity or structure adapted or configured for carrying out the relevant function.

For example, an embodiment provides a method for managing a multi-tenant software application adapted to serve a plurality of tenants. The method comprises the following steps. A deletion request for deleting one of the tenants is received. The tenant to be deleted is disabled. The disabled tenant is deleted after a protection period from the deletion request. An addition request for adding a new tenant to the software application is received. The new tenant is allocated to a selected instance of the software application; the selected instance is selected between one of a set of one or more available instances of the software application and a new instance of the software application, according to an indication of the number of the tenants allocated to each available instance reduced according to the number of the disabled tenants thereof.

However, the multi-tenant software application may be of any type (for example, a performance monitor, a load balancer) and it may serve any number of tenants. The deletion request may be of any type (for example, after the expiration of the trial/subscription period without any grace period or upon an explicit request). The tenant to be deleted may be disabled in any way (for example, by still allowing the disabled tenant to browse its data). The protection period may be set in any way (see below), and the disabled tenant may be deleted in any way (for example, with its data in the partitioned structures that is removed only when the disabled tenant is deleted, or by making a back-up copy). The addition request may be of any type (for example, only for subscribed tenants without the option of any trial period, distinguishing between a free mode with reduced functionalities and a business mode with full functionalities). The selected instance may be selected in any way, and the new tenant may be allocated thereto in any way (see below).

In an embodiment, said step of allocating the new tenant comprises the following operations. At least one of the available instances is searched that is eligible for allocating the new tenant, as having the number of the tenants minus the number of the disabled tenants lower than a maximum value; the selected instance is set to the new instance when no available instance is eligible for allocating the new tenant or to one of said at least one eligible available instance otherwise.

However, the maximum value may be of any type (for example, specific for each instance or the same for all of them, static or varying dynamically according to environmental conditions). In any case, the number of the tenants may be reduced according to the number of the disabled tenants in any way (for example, by using a reduction factor); more generally, the selection of the selected instance may be based on different, additional or alternative criteria (for example, weighting the tenants that are not disabled according to their average activity).

In an embodiment, said step of allocating the new tenant comprises deploying at least one new computing machine running the new instance.

However, the computing machines may be in any number and of any type (either virtual or physical); in any case, the possibility of simply installing the new instance on pre-existing computing machines is not excluded.

In an embodiment, said step of allocating the new tenant comprises the following operations. A new slot is created of one or more resources of the selected instance when no free slot that is not assigned to any tenant thereof is available. A tree slot of the selected instance is assigned to the new tenant.

However, the resources of each slot may be in any number (down to none) and of any type (for example, IP addresses). In any case, the possibility of pre-apportioning all the slots that may be required in advance is not excluded.

In an embodiment, said deleting the disabled tenant comprises dropping the slot assigned to the disabled tenant when the number of slots of the selected instance is higher than the maximum value or freeing the slot assigned to the disabled tenant otherwise.

However, the possibility of always dropping or freeing the slot of the disabled tenant is not excluded.

In an embodiment, the slot assigned to each tenant comprises one or more filters for accessing data of the tenant.

However, the filters may be in any number and of any type (for example, access keys).

In an embodiment, said step of deleting the disabled tenant comprises deleting the disabled tenant after one or more shared structures storing the data of the disabled tenant have been purged.

However, the shared structures may be in any number and of any type (for example, account records). In any case, the possibility of defining the protection period in other ways, even when no data of the tenant is stored in any shared structure, is not excluded (for example, when the deletion of the tenants is performed periodically since its requires shutting down the multi-tenant software application).

In an embodiment, the method further comprises purging each shared structure periodically.

However, the shared structures may be purged with any frequency (either specific for each shared structure or the same for all of them). In any case, the shared structures may be purged with different policies (for example, in response to the reaching of a threshold size).

In an embodiment, the software application is provided as a service.

However, the service may be of any type (see below); in any case, the possibility of providing the software application in a standard (non-service oriented) environment is not excluded.

In an embodiment, the software application is provided as a service in a cloud environment.

However, the cloud environment may be of any type (for example, private or hybrid). In any case, the possibility of delivering the service in a different environment (for example, a classic client-server environment) is not excluded.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program, which is configured for causing a computing system to perform the steps of the above-described method. A further embodiment provides a computer program product comprising a non-transitory computer readable medium embodying a computer program, which computer program is loadable into a working memory of a computing system thereby configuring the computing system to perform the same method.

However, the computer program may be implemented as a stand-alone module, as a plug-in for a pre-existing software program (for example, a cloud manager), or even directly in the latter. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the same method.

However, the method may also be carried out on a system based on a different architecture (for example, a local, wide area, global, cellular or satellite network), and exploiting any type of (wired and/or wireless) connections. However, its implementation on a stand-alone computer is not excluded. In any case, each computing machine used to implement the method may have another structure or may comprise similar elements; moreover, it is possible to replace the computing machine with any code execution entity, either based on a physical machine or a virtual machine or any combination thereof.

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method, in a data processing system comprising a processor and a memory coupled to the processor, for managing a multi-tenant software application adapted to serve a plurality of tenants, the method comprising:
   receiving, by the processor, a deletion request for deleting one of the tenants from the plurality of tenants,
   responsive to receiving the deletion request, disabling, by the processor, an instance of the software application associated with the tenant to be deleted,
   deleting, by the processor, the disabled instance of the software application associated with the tenant to be deleted after a protection period from the deletion request, wherein the deleting of the disabled instance of the software application associated with the tenant to be deleted comprises:
      responsive to the assigned instances of the software application being in excess of the pre-apportioned set of instances of the software application, dropping, by the processor, the instance of the software application assigned to the disabled tenant, and
      responsive to the assigned instances of the software application being less than the pre-apportioned set of instances of the software application, freeing, by the processor, the instance of the software application assigned to the disabled tenant,
   receiving, by the processor, an addition request for adding a new tenant to the software application,
   responsive to a pre-apportioned instance of the software application being available in a pre-apportioned set of instances of the software application, allocating, by the processor, the available pre-apportioned instance of the software application for the new tenant to a selected instance of the software application, and
   responsive to a pre-apportioned instance of the software application failing to be available in the pre-apportioned set of instances of the software application, allocating, by the processor, a new instance of the software application in excess of the pre-apportioned set of instances of the software application to the selected instance of the software application.

2. The method according to claim 1, wherein the allocating of the available pre-apportioned instance of the software application for the new tenant comprises:
   searching, by the processor, for at least one pre-apportioned instance of the software application eligible for allocating to the new tenant in the pre-apportioned set of instances of the software application, and
   responsive to the at least one available pre-apportioned instance of the software application being eligible, setting, by the processor, the selected instance of the software application to one of the at least one available instance of the software application.

3. The method according to claim 1, wherein the allocating of the available pre-apportioned instance of the software application for the new tenant comprises:
   searching, by the processor, for a at least one pre-apportioned instance of the software application eligible for allocating to the new tenant in the pre-apportioned set of instances of the software application, and
   responsive to the at least one available pre-apportioned instance of the software application failing to be eligible, deploying, by the processor, at least one new computing machine running the new instance of the software application.

4. The method according to claim 1, wherein the allocating of the new instance of the software application for the new tenant comprises:
   creating, by the processor, the new instance of the software application when no free pre-apportioned instance of the software application in the pre-apportioned set of instances of the software application is available, and
   assigning, by the processor, the new instance of the software application as the selected instance of the software application to the new tenant.

5. The method according to claim 1, wherein an instance of the software application assigned to each tenant comprises one or more filters for accessing data of the tenant.

6. The method according to claim 1, wherein the deleting of the disabled instance of the software application associated with the tenant to be deleted comprises:
   deleting, by the processor, the disabled instance of the software application associated with the tenant to be deleted after one or more shared data structures storing the data of the disabled tenant have been purged.

7. The method according to claim 6, further comprising:
purging, by the processor, each shared data structure periodically.

8. The method according to claim 1, wherein the multi-tenant software application is provided as a service.

9. The method according to claim 8, wherein the multi-tenant software application is provided as a service in a cloud environment.

10. A computer program product comprising a non-transitory computer readable storage medium having a computer readable program stored therein, wherein the computer readable program, when executed on the computing system, causes the computing system to:
receive a deletion request for deleting one tenant from a plurality of tenants,
responsive to receiving the deletion request, disable an instance of the software application associated with the tenant to be deleted,
delete the disabled instance of the software application associated with the tenant to be deleted after a protection period from the deletion request, wherein the instruction to delete the disabled instance of the software application associated with the tenant to be deleted further causes the processor to:
responsive to the assigned instances of the software application being in excess of the pre-apportioned set of instances of the software application, drop the instance of the software application assigned to the disabled tenant, and
responsive to the assigned instances of the software application being less than the pre-apportioned set of instances of the software application, free the instance of the software application assigned to the disabled tenant,
receive an addition request for adding a new tenant to the software application,
responsive to a pre-apportioned instance of the software application being available in a pre-apportioned set of instances of the software application, allocate the available pre-apportioned instance of the software application for the new tenant to a selected instance of the software application, and
responsive to a pre-apportioned instance of the software application failing to be available in the pre-apportioned set of instances of the software application, allocate a new instance of the software application in excess of the pre-apportioned set of instances of the software application to the selected instance of the software application.

11. A system comprising:
a processor; and
a memory coupled to the processor, wherein the memory comprises instructions which, when executed by the processor, cause the processor to:
receive a deletion request for deleting one tenant from a plurality of tenants,
responsive to receiving the deletion request, disable an instance of the software application associated with the tenant to be deleted,
delete the disabled instance of the software application associated with the tenant to be deleted after a protection period from the deletion request, wherein the instruction to delete the disabled instance of the software application associated with the tenant to be deleted further causes the processor to:
responsive to the assigned instances of the software application being in excess of the pre-apportioned set of instances of the software application, drop the instance of the software application assigned to the disabled tenant, and
responsive to the assigned instances of the software application being less than the pre-apportioned set of instances of the software application, free the instance of the software application assigned to the disabled tenant,
receive an addition request for adding a new tenant to the software application,
responsive to a pre-apportioned instance of the software application being available in a pre-apportioned set of instances of the software application, allocate the available pre-apportioned instance of the software application for the new tenant to a selected instance of the software application, and
responsive to a pre-apportioned instance of the software application failing to be available in the pre-apportioned set of instances of the software application, allocate a new instance of the software application in excess of the pre-apportioned set of instances of the software application to the selected instance of the software application.

12. The system according to claim 11, wherein the instructions to allocate the available pre-apportioned instance of the software application for the new tenant further causes the processor to:
search for at least one pre-apportioned instance of the software application eligible for allocating to the new tenant in the pre-apportioned set of instances of the software application, and
responsive to the at least one available pre-apportioned instance of the software application being eligible, set the selected instance of the software application to one of the at least one available instance of the software application.

13. The system according to claim 11, wherein the instructions to allocate the new instance of the software application for the new tenant further causes the processor to:
create the new instance of the software application when no free pre-apportioned instance of the software application in the pre-apportioned set of instances of the software application is available, and
assign the new instance of the software application as the selected instance of the software application to the new tenant.

14. The system according to claim 11, wherein an instance of the software application assigned to each tenant comprises one or more filters for accessing data of the tenant.

15. The system according to claim 11, wherein the instructions to allocate the available pre-apportioned instance of the software application for the new tenant further causes the processor to:
search for a at least one pre-apportioned instance of the software application eligible for allocating to the new tenant in the pre-apportioned set of instances of the software application, and
responsive to the at least one available pre-apportioned instance of the software application failing to be eligible, deploy at least one new computing machine running the new instance of the software application.

16. The system according to claim 11, wherein the instructions to delete the disabled instance of the software application associated with the tenant to be deleted further causes the processor to:
delete the disabled instance of the software application associated with the tenant to be deleted after one or more shared data structures storing the data of the disabled tenant have been purged.

17. The system according to claim 16, wherein the instructions further cause the processor to:
purge each shared data structure periodically.

18. The system according to claim 11, wherein the multi-tenant software application is provided as a service and wherein the multi-tenant software application is provided as a service in a cloud environment.

* * * * *